C. J. CHLOUPEK.
POWER INCREASING ATTACHMENT FOR AUTOMOBILES AND SIMILAR DRIVEN VEHICLES.
APPLICATION FILED FEB. 6, 1913.
1,145,830.
Patented July 6, 1915.
2 SHEETS—SHEET 1.
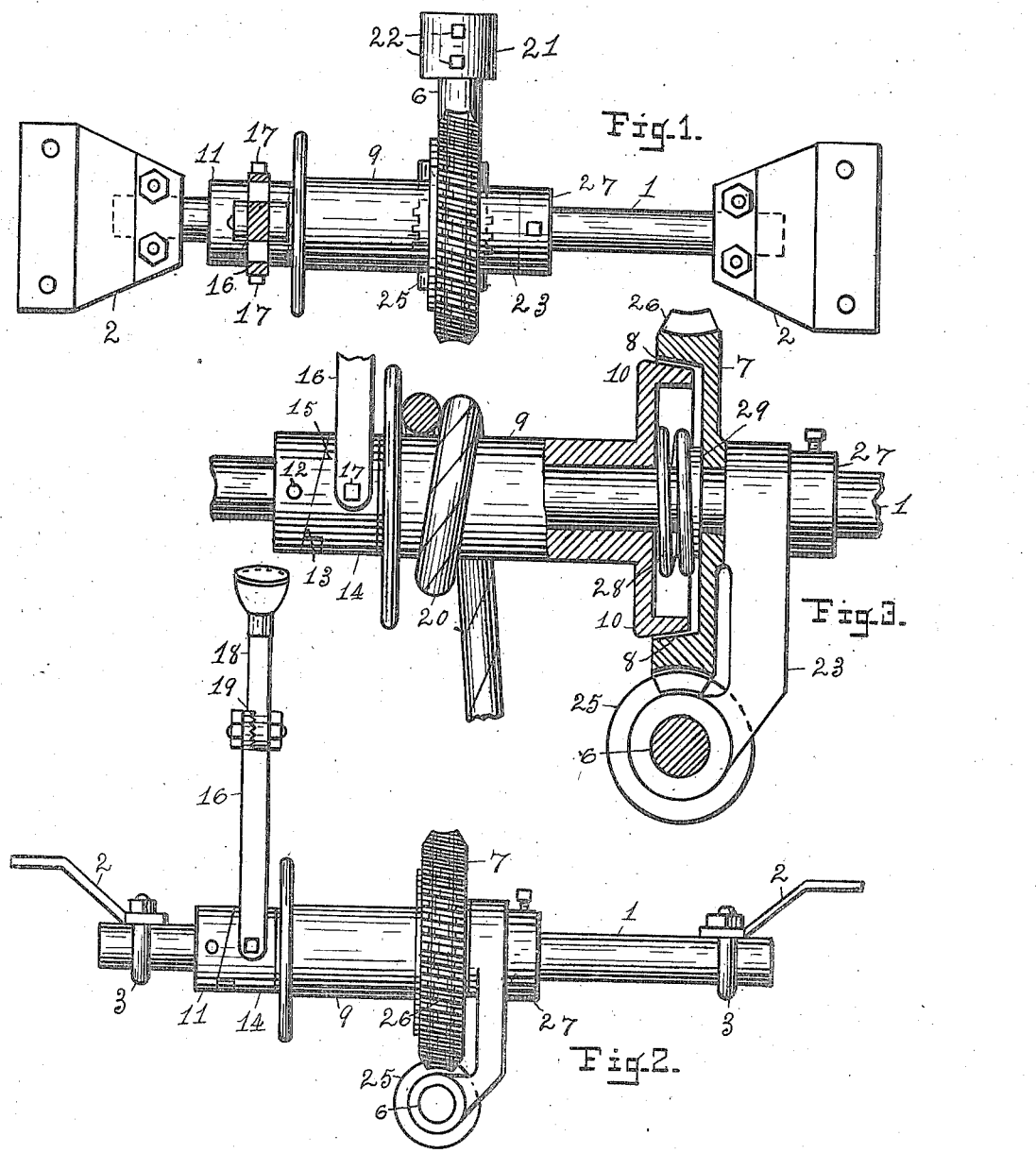
WITNESSES:
C. M. Alten.
K. A. Pickert
INVENTOR
Charles J. Chloupek.
BY G. H. Albee
ATTORNEY

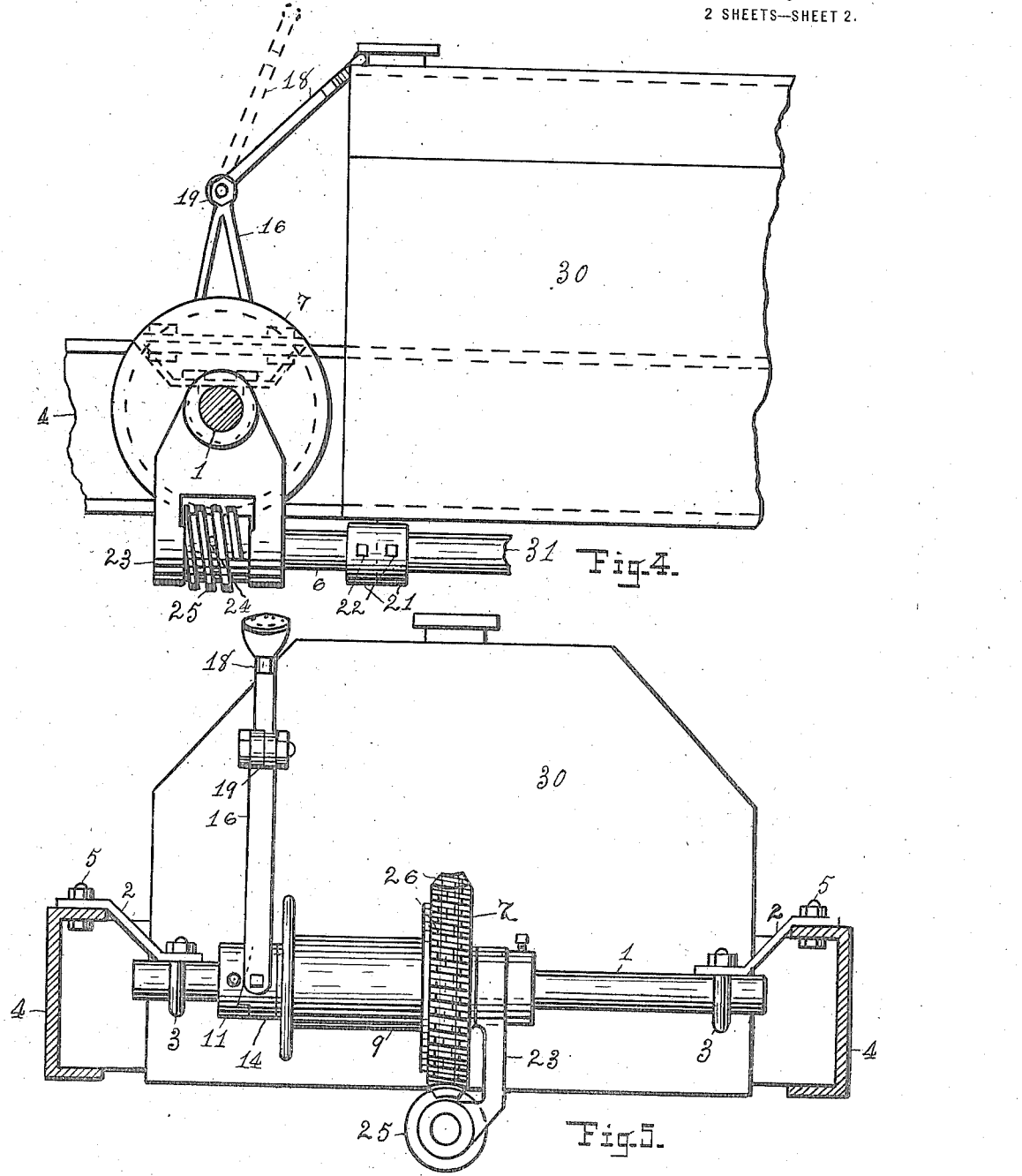

UNITED STATES PATENT OFFICE.

CHARLES J. CHLOUPEK, OF GREEN BAY, WISCONSIN.

POWER-INCREASING ATTACHMENT FOR AUTOMOBILES AND SIMILAR DRIVEN VEHICLES.

1,145,830.  Specification of Letters Patent.  Patented July 6, 1915.

Application filed February 6, 1913. Serial No. 746,503.

*To all whom it may concern:*

Be it known that I, CHARLES J. CHLOUPEK, a citizen of the United States, residing at Green Bay, in the county of Brown and State of Wisconsin, have invented a new and useful Power-Increasing Attachment for Automobiles and Similar Driven Vehicles, of which the following is a specification.

My invention is an attachment to be secured to the automobile frame at the front thereof for pulling an automobile or similar driven vehicle out of a mud hole or other bad place in the roadway, whenever the vehicle motor lacks the power to do it, and it consists of a shaft to be coupled with a power driven shaft of the vehicle with a suitable coupling, said coupled on shaft carrying a worm which is arranged for turning a worm wheel which is mounted upon a second shaft arranged at right angles with the worm shaft, is arranged at right angles with the motor driven shaft, is connected near its ends with the side frame irons of the vehicle with suitable clamps and bolts, and is provided with a windlass spool and rope, the operation of which is under the control of the motor driver, and the invention is shown in the accompanying drawing, in which,—

Figure 1 is a top view or plan of the device. Fig. 2 is a front elevation, as it appears when secured in position upon the front of an automobile. Fig. 3 is a like elevation of the mechanism upon a larger scale than the others, but including only the mechanism, and the mid-length of the second named shaft, the worm shaft and its suspending bracket, a part of the mechanism being in section. Fig. 4 is an end view of the worm wheel carrying shaft at the left of and including the worm carrying bracket, one of the side frame irons of the vehicle being removed and showing the device as attached to the forward end of an automobile. Fig. 5 is an elevation of the device attached to an automobile, the side frames of which are in section.

Similar numerals indicate like parts in the several views.

1, indicates a shaft which is provided near each end with a metallic plate 2, which is bolted to the shaft with U shaped bolts 3, and the plates are bent for resting upon the side frame irons 4, of the automobile frame, and they are fitted with bolts 5 for securing the plates thereon, the plates being bent for bringing its worm shaft 6, in axial line with the engine, or other shaft with which the worm shaft may be coupled. The shaft 1, has loosely mounted thereon a worm wheel 7, which is also one member of a clutch 8, the other member being formed upon the end flange of a rope spool 9, by making said end flange a frustum of a cone 10, which is fitted to the tapered clutch member 8. The spool is loosely mounted upon said shaft and just beyond the opposite end from the clutch member, a collar 11, is secured with a pin 12, or otherwise, the end of the collar toward the spool being provided with a cam face 13. Between the collar and spool, a loose sleeve 14, is mounted, which is provided with a cam shaped end 15, mating with the cam shaped end 13 of the collar. A lever 16, having branch arms is connected by said arms with the opposite sides of the collar with bolts 17, and is provided with a handle 18, which is arranged by means of the ratchet toothed joint 19, which permits its connection with the lever at various angles, to be located at its free end within easy reach of the motor driver, the cams of the collar and sleeve being of such form that the pressure downward by the motor driver will force the spool endwise and engage the two clutch members. The spool is to be provided with a rope 20, one end of which is to be secured thereto, and the other end, when the vehicle becomes immovable in the road, to a fixed object, which may be a tree, stone, fence post, or a stake driven into the ground, at some distance ahead of the vehicle.

For winding the rope upon the spool, the shaft 6, is coupled by means of the coupling 21, to a power driven shaft of the vehicle, in the present case the coupling being secured with bolts or set screws 22. A bracket 23, is loosely mounted upon the shaft 1 and serves as a journal box for the shaft 6. Secured to the shaft 6 with a pin 24, or otherwise, is a worm 25, the threads of which engage the teeth 26, of the worm wheel 7, for turning it. A collar 27, is secured upon the shaft 1, against which the bracket 23 and worm wheel are held by the resiliency of the spiral spring 28, which spring also acts to separate the two clutch members whenever the lever 16, is swung into the clutch releasing position. A fixed collar 29, may also be secured upon the shaft 1, just inside of the worm wheel for holding the wheel in its proper position upon the shaft 1.

30, indicates the automobile bonnet; 31, the vehicle motor shaft to which the shaft 6, is coupled.

It will be apparent that with the greatly increased power which the worm and worm wheel bring into use, over the power which the vehicle motor can apply to the vehicle axle, that no situation is liable to be encountered, which this device cannot relieve it from, easily and quickly. The device is to be secured upon an automobile or other like driven vehicle, whenever it is anticipated that exceedingly poor roads will be met with in any particular trip, by means of the bolts 5, or it may be left on all of the time as the use of the vehicle requires, its coupling in either case not being connected to the power driven shaft of the vehicle until circumstances require its use. The vehicle having reached a place in the road where the power of its motor is insufficient for drawing it, this device is then to be coupled to it as has been described and its windlass rope made fast to some fixed object at some distance ahead of the vehicle, when power being applied to the shaft 31, the driver has but to press downward upon the lever handle 18, which will throw the clutch member 10 into engagement with the member 8, revolve the spool 9, wind the rope 20, thereon, and thereby draw the vehicle out of its powerless situation.

Having described my invention, what I claim and desire to secure by Letters Patent, is,—

1. In combination, a shaft adapted to be coupled to a power driven shaft of a vehicle, a worm upon said first named shaft, a worm wheel forming one member of a clutch mounted loosely upon a shaft arranged at right angles with said worm shaft and in engagement with said worm, a bracket mounted loosely upon said worm wheel shaft and supporting said worm shaft, clamping plates near each end of the worm wheel shaft for securing the same to a vehicle frame, a rope receiving spool forming a sliding member of a clutch mounted loosely upon the worm wheel shaft, a rope thereon, one end secured thereto and the other being adapted for being secured to a fixed object, a lever pivotally mounted for moving said sliding clutch member toward and from the first mentioned clutch member and a spring arranged for releasing the engagement of said clutch members.

2. In combination, a shaft adapted to be coupled to a power driven shaft of a vehicle, a worm upon said first named shaft, a worm wheel forming one member of a clutch mounted loosely upon a shaft arranged at right angles with said worm shaft and in engagement with said worm, a bracket mounted loosely upon said worm wheel shaft and supporting said worm shaft, clamping plates near each end of the worm wheel shaft for securing the same to a vehicle frame, a rope receiving spool forming a sliding member of a clutch mounted loosely upon the worm wheel shaft, a rope thereon, one end secured thereto and the other being adapted to be secured to a fixed object, a collar fixed upon said worm wheel shaft outside of said spool, its end toward the spool being provided with a cam face, a sleeve loosely mounted between the collar and spool, a mating cam face thereon adjoining said collar, a lever arranged for turning said sleeve and throwing said two cam faces into and out of engagement and a spring arranged for releasing the engagement of said clutch members.

CHARLES J. CHLOUPEK.

Witnesses:
 Jos. P. Neugent,
 Jacob L. Reis.